United States Patent
Ochi et al.

[11] Patent Number: 6,149,713
[45] Date of Patent: Nov. 21, 2000

[54] FLUE GAS TREATING PROCESS

[75] Inventors: Eiji Ochi; Takeo Shinoda, both of Tokyo; Toru Takashina; Susumu Okino, both of Hiroshima, all of Japan

[73] Assignee: Mitsubishi Heavy Industries, Ltd., Tokyo, Japan

[21] Appl. No.: 09/191,958

[22] Filed: Nov. 13, 1998

[30] Foreign Application Priority Data

Dec. 22, 1997 [JP] Japan .................................... 9-365541

[51] Int. Cl.⁷ .................................................. B03C 3/017
[52] U.S. Cl. .................... 95/28; 95/64; 95/67; 95/70; 95/195; 95/235; 96/53; 96/74; 96/3; 96/234
[58] Field of Search .................... 95/64, 67, 70, 95/71, 187, 235, 195–197, 28; 96/52, 53, 55, 74, 234, 1–3

[56] References Cited

U.S. PATENT DOCUMENTS

| | | | |
|---|---|---|---|
| 2,677,439 | 5/1954 | Hedberg et al. | 95/64 X |
| 3,668,833 | 6/1972 | Cahill, Jr. | 95/64 X |
| 3,785,119 | 1/1974 | McIlvaine | 95/64 X |
| 4,019,444 | 4/1977 | Kleeberg et al. | 95/64 X |
| 4,297,332 | 10/1981 | Tatani et al. | 95/64 X |
| 4,317,806 | 3/1982 | Leisegang | 95/64 X |
| 5,470,556 | 11/1995 | Samish | 95/64 X |

FOREIGN PATENT DOCUMENTS

| | | |
|---|---|---|
| 0 498 020 A1 | 8/1992 | European Pat. Off. . |
| 3325 140 A1 | 1/1985 | Germany . |
| 250 167 A1 | 9/1987 | Germany . |
| 46-40482 | 11/1971 | Japan ........ 95/64 |
| 61178022 | 8/1986 | Japan . |
| 03070907 | 3/1991 | Japan . |
| 05057142 | 3/1993 | Japan . |
| 2 154 468 | 9/1985 | United Kingdom . |

*Primary Examiner*—Richard L. Chiesa
*Attorney, Agent, or Firm*—Myers Bigel Sibley & Sajovec

[57] ABSTRACT

The dust concentration of the flue gas leaving an electrostatic precipitator and introduced into an absorption tower of a desulfurizer is adjusted to a level of 100 to 500 mg/Nm³. At the same time, a dust slurry having a higher dust concentration is separated and withdrawn from the slurry within the aforesaid absorption tower, and then subjected to a solid-liquid separation treatment. Thus, solid matter containing dust at a high concentration is extracted and discharged out of the system of the desulfurizer.

5 Claims, 2 Drawing Sheets

FLUE GAS TREATING PROCESS

BACKGROUND OF THE INVENTION

This invention relates to a flue gas treating process for removing at least dust and sulfur dioxide from the flue gas of a coal-fired boiler or the like by use of a dry electrostatic precipitator and a desulfurizer based on the wet lime-gypsum method. In particular, it relates to a flue gas treating technique which makes it possible to reduce the size of the dry electrostatic precipitator markedly and achieve a considerable saving of cost.

An example of a known high-performance flue gas treating system for removing dust (such as fly ash) and sulfur oxides (chiefly sulfur dioxide) efficiently from flue gas discharged from a coal-fired boiler or the like is disclosed in Japanese Patent Publication No. 56377/'95.

According to this process, as illustrated in FIG. 1 of the aforementioned patent, flue gas from a coal-fired boiler is cooled to a temperature of 80 to 110° C. by means of an air heater (AH) or the heat recovery section of a gas-gas heater (GGH), introduced into a dry electrostatic precipitator (dry EP) in order to reduce the dust concentration of the flue gas to 100 mg/Nm$^3$ or less, and then introduced into an absorption tower of a combined type desulfurizer based on the wet lime-gypsum method. In this absorption tower, the flue gas is brought into contact with a slurry containing a calcium compound as the absorbent, whereby the sulfur oxide concentration is reduced and, at the same time, the dust concentration thereof is reduced to a final target value of 10 mg/Nm$^3$ or less.

That is, in this process, the temperature of the flue gas introduced into the electrostatic precipitator is made lower than in the prior art (120–160° C.) to reduce the specific resistance of dust. Thus, a back discharge phenomenon in the electrostatic precipitator can be avoided to reduce the size of the electrostatic precipitator and improve the performance thereof. Moreover, the dust present on the outlet side of the electrostatic precipitator consists essentially of rescattered dust particles which have aggregated and enlarged, so that the dedusting capability of the desulfurizer is also improved.

Furthermore, heat recovery by a gas-gas heater, which has hitherto been carried out on the downstream side of the electrostatic precipitator, is carried out on the upstream side of the electrostatic precipitator. As a result, a large amount of dust is present in the flue gas undergoing heat recovery by the gas-gas heater, so that sulfur trioxide present in the flue gas can be prevented from condensing in the heat recovery section of the gas-gas heater and producing a harmful mist. This also makes it possible to enhance the degree of dust removal in the electrostatic precipitator without consideration for such problems with sulfur trioxide.

Accordingly, the above-described flue gas treating process is excellent in that, when compared with the constructions of the prior art (e.g., the construction shown in FIG. 4 of the aforementioned patent), various requirements (i.e., an improvement in performance and a reduction in the size and cost of equipment) which are becoming severer year by year in this technical field from the viewpoint of global environmental protection can be satisfied to a considerable extent.

However, in the flue gas treating process a disclosed in the aforementioned patent, the dust concentration of the flue gas leaving the dry electrostatic precipitator and introduced into the absorption tower is adjusted to 100 mg/Nm$^3$ or less (usually about 30–50 mg/Nm$^3$). Thus, most of the dust present in flue gas at a concentration of about 10,000 to 20,000 mg/Nm$^3$ is captured and removed in the electrostatic precipitator, and a slight amount of residual dust is removed in the absorption tower of the desulfurizer. Consequently, although the size of the dry electrostatic precipitator can be reduced as compared with the prior art, the electrostatic precipitator still has a large size and involves a considerable cost. Thus, it is desired to achieve a further reduction in size and cost.

The conventional conception which requires the dust concentration to be reduced to 100 mg/Nm$^3$ or less in the electrostatic precipitator is based on the conventional technical common sense that sufficiently high dedusting capability cannot be achieved in the absorption tower of the desulfurizer and, therefore, most dust must removed in the electrostatic precipitator so as to reduce the final dust concentration to 10 mg/Nm$^3$ or less. However, such sharing of the dedusting load has not necessarily been optimal.

Furthermore, even if sufficiently high dedusting capability can be achieved in the desulfurizer, the combined type desulfurizer still involves problems such as a reduction in the purity of gypsum obtained as a by-product due to contamination with dust, and a loss in the activity of limestone used as the absorbent. With consideration for these problems, the dedusting load of the electrostatic precipitator has been extremely high in the prior art.

SUMMARY OF THE INVENTION

A first object of the present invention is to provide a flue gas treating process wherein the sharing of the dedusting load between the electrostatic precipitator and the desulfurizer can be optimized to achieve a further reduction in the size and cost of the electrostatic precipitator.

A second object of the present invention is to provide a flue gas treating process wherein, even when a large amount of dust is captured in the absorption tower of the desulfurizer, the dust can be effectively separated so as to avoid troubles (e.g., a reduction in the purity of gypsum and a loss in the activity of the absorbent) due to the dust.

In order to accomplish the above-described objects, the present invention provides a flue gas treating process wherein flue gas is cooled to a temperature of 80 to 110° C. by heat recovery means, introduced into a dry electrostatic precipitator in order to reduce the dust concentration of the flue gas, and then introduced into an absorption tower of a desulfurizer based on the wet lime-gypsum method in order to reduce the sulfur oxide concentration and dust concentration of the flue gas by bringing the flue gas into contact with a slurry containing a calcium compound as the absorbent, and the dust concentration of the flue gas leaving the dry electrostatic precipitator and introduced into the absorption tower is adjusted to a level of 100 to 500 mg/Nm$^3$.

In the flue gas treating process described in the above, a dust slurry having a higher dust concentration may be separated and withdrawn from the slurry within the absorption tower, and then subjected to a solid-liquid separation treatment, whereby solid matter containing dust at a high concentration is extracted and discharged out of the system of the desulfurizer.

In the flue gas treating process described in the above, a part of the slurry within the absorption tower may be withdrawn and mixed with water, this mixture is allowed to stay in an agitation tank so as to cause the solid gypsum present in the slurry to be dissolved in the liquid of the slurry, and the resulting slurry is subjected to a solid-liquid separation treatment, whereby solid matter containing dust at a high concentration is extracted and discharged out of the system of the desulfurizer.

In the flue gas treating process described in the above, when a part of the slurry within the absorption tower is withdrawn, a dust slurry having a higher dust concentration may be separated and withdrawn.

In the flue gas treating process described in the above, at least a part of the liquid resulting from the solid-liquid separation treatment may be reused by returning it to the slurry within the absorption tower.

In accordance with the present invention, flue gas is cooled to a temperature of 80 to 110° C. by heat recovery means before it is introduced into a dry electrostatic precipitator. Consequently, the specific resistance of dust present in the flue gas is reduced to improve the dedusting capability per unit volume of the dry electrostatic precipitator, so that a reduction in the size and cost thereof can be achieved. In addition to this, the present invention is characterized in that the dust concentration of the flue gas at the outlet of the electrostatic precipitator is adjusted to a level of 100 to 500 mg/Nm$^3$. Consequently, the load of the electrostatic precipitator is markedly lessened, so that a further considerable reduction in the size and cost of the electrostatic precipitator can be achieved.

Moreover, if the dust concentration at the outlet of the electrostatic precipitator is in the range of 100 to 500 mg/Nm$^3$, the dedusting function of the desulfurizer installed on the downstream side of the electrostatic precipitator permits the final dust concentration to be reduced to 10 mg/Nm$^3$ or less. Thus, sufficiently high overall dedusting capability can be achieved. That is, the present invention provides a so-called high-performance flue gas treating system wherein the sharing of the dedusting load between the electrostatic precipitator and the desulfurizer is optimized and the dedusting capability of the desulfurizer is fully utilized, so that not only high overall dedusting capability, but also a further significant reduction in the size and cost of the electrostatic precipitator can be achieved.

Moreover, in a preferred embodiment, a dust slurry having a higher dust concentration may be separated and withdrawn from the slurry within the absorption tower, and then subjected to a solid-liquid separation treatment, whereby solid matter containing dust at a high concentration may be extracted and discharged out of the system. Thus, the dust concentration of the slurry within the absorption tower can be maintained at a low level, notwithstanding the fact that the desulfurizer is designed so as to capture a larger amount of dust than in the prior art. Consequently, highly pure gypsum can be recovered and, at the same time, a loss in the activity of the absorbent (e.g., limestone) present in the slurry can be minimized. If a loss in the activity of the absorbent occurs, a suitable measure (e.g., an increase in the feed rate of the absorbent) must be taken in order to achieve the same desulfurization capability, and this will lead to difficulties such as an increase in operating cost.

Moreover, in a preferred embodiment, a part of the slurry within the absorption tower may be withdrawn, diluted with a liquid so as to cause the solid gypsum present in the slurry to be dissolved in the liquid of the slurry, and then subjected to a solid-liquid separation treatment, whereby solid matter containing dust at a high concentration may be extracted and discharged out of the system of the desulfurizer. This also has the advantage that the dust concentration of the slurry within the absorption tower can be maintained at a low level and highly pure gypsum can be recovered.

Moreover, in a preferred embodiment, when a part of the slurry is withdrawn in the above-described manner, a dust slurry having a higher dust concentration may be separated and withdrawn. Thus, the solid matter discharged out of the system will contain dust at a higher concentration, so that dust can be more effectively separated and discharged. Consequently, the dust concentration of the slurry within the absorption tower can be maintained at a lower level.

Furthermore, in a preferred embodiment, at least a part of the liquid resulting from any one of the aforesaid solid-liquid separation treatments may be reused by returning it to the slurry within the absorption tower. Thus, the amount of water (e.g., industrial water) supplied as a liquid component constituting the slurry can be reduced. Moreover, when the solid gypsum present in the withdrawn slurry is dissolved in the liquid as described in claim 3, the liquid having solid gypsum dissolved therein is returned to the absorption tower. This is effective in further increasing the gypsum concentration of the slurry within the absorption tower and correspondingly reducing the dust concentration of the slurry within the absorption tower.

DETAILED DESCRIPTION OF THE PREFERRED EMBODIMENTS

One embodiment of the present invention is described below with reference to the accompanying drawings.

Figure 1:
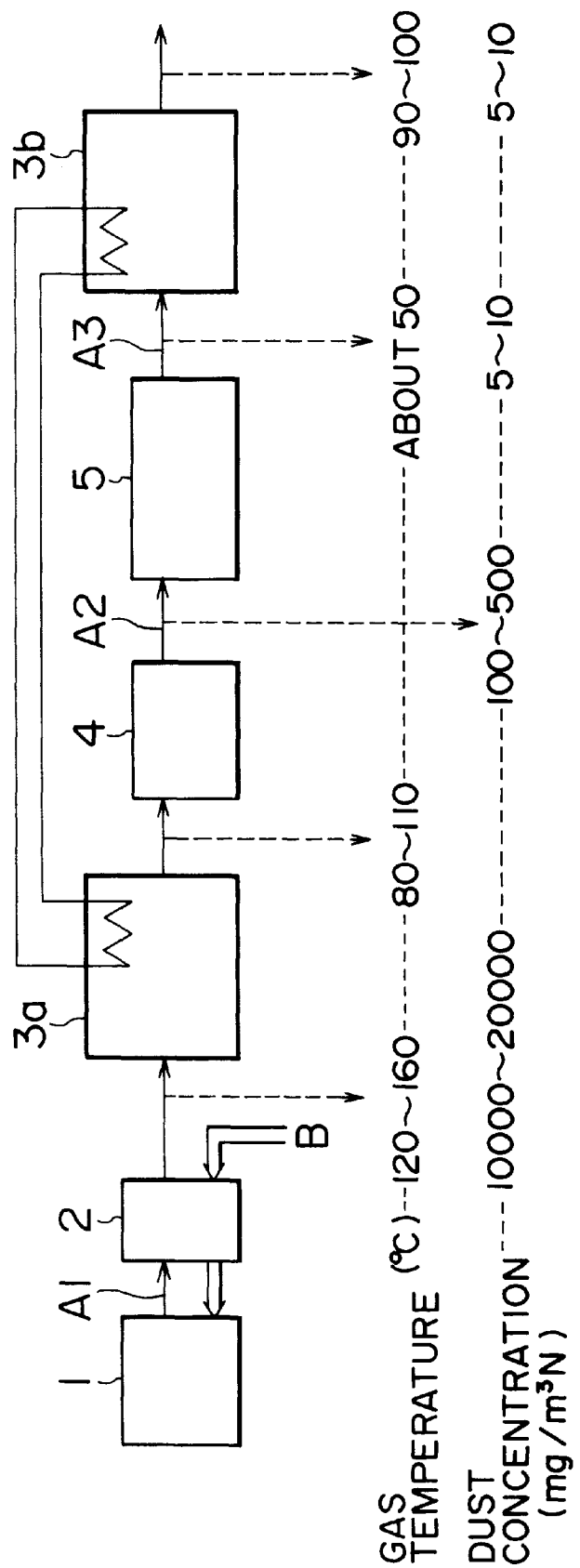
FIG. 1 is a block diagram illustrating a flue gas treating process in accordance with one embodiment of the present invention and the construction of equipment for carrying out it.

FIG. 1 is a block diagram illustrating a flue gas treating process in accordance with one embodiment of the present invention. In this flue gas treating system, untreated flue gas A1 discharged from a coal-fired boiler 1 is first introduced into an air heater 2 (heat recovery means) where air B supplied to boiler 1 is heated by the heat of flue gas A1. In this air heater 2, untreated flue gas A1 is cooled to 120–160° C.

Then, flue gas A1 is introduced into the heat recovery section 3a of a non-leak type gas-gas heater where heat is recovered therefrom. After being thus cooled to 80–110° C., flue gas A1 is introduced into a dry electrostatic precipitator 4. In this electrostatic precipitator 4, an appreciable amount of dust is removed from flue gas A1. As a result, flue gas A2 having its dust concentration reduced to 100–500 mg/Nm$^3$ is discharged therefrom.

Flue gas A2 leaving electrostatic precipitator 4 is introduced into a combined type desulfurizer 5 where sulfur dioxide is chiefly removed by absorption and, at the same time, dust is also captured and removed. Thereafter, the resulting flue gas is discharged as treated flue gas A3.

According to actually measured data obtained in a coal-fired thermal electric power plant employing a high-performance flue gas treating system similar to this embodiment (in which the absorption tower comprises a packed tower), the actual degree of dust removal in the absorption tower of the desulfurizer is as high as about 97–98%. Consequently, even if the dust concentration of the flue gas at the inlet of the absorption tower is 100–500 mg/Nm$^3$, the dust concentration of the flue gas at the outlet of the absorption tower can be reduced to about 5–10 mg/Nm$^3$.

In the reheating section 3b of the gas-gas heater, flue gas A3 leaving desulfurizer 5 is heated to a temperature (90–100° C.) suitable for discharge into the atmosphere, by use of the heat recovered from flue gas A1. Thereafter, flue gas A3 is discharged from a stack (not shown) into the atmosphere.

Figure 2:
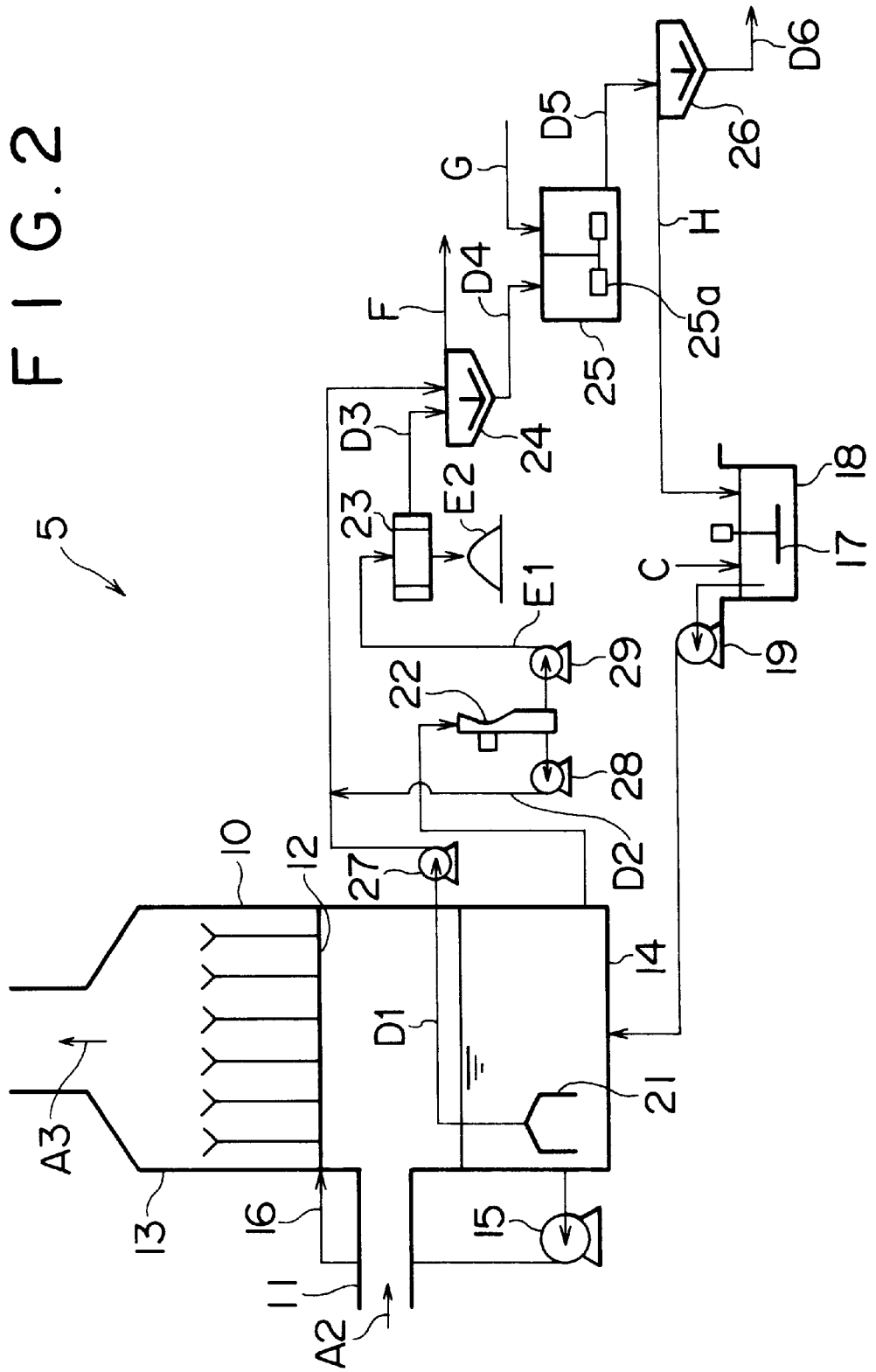
FIG. 2 is a schematic diagram showing the detailed construction of the desulfurizer included in the aforesaid construction of equipment.

Next, FIG. 2 is a schematic diagram showing the preferred construction of desulfurizer 5 in accordance with this embodiment. This desulfurizer 5 has an absorption tower 10 for bringing flue gas A2 leaving electrostatic precipitator 4 into gas-liquid contact with a slurry containing limestone C as the absorbent. Thus, sulfur dioxide is absorbed from flue gas A2 and, at the same time, the dust remaining in flue gas A2 is captured.

In this embodiment, absorption tower 10 consists of a counterflow liquid-column tower in which flue gas A2 introduced through a flue gas inlet section 11 formed in the lower part thereof is made to flow upward through the tower, brought on its way into gas-liquid contact with an absorbing fluid injected upward in the form of liquid columns from a plurality of nozzles formed in a plurality of spray pipes 12 disposed in parallel within the tower, and discharged as treated flue gas A3 from a flue gas outlet section 13 formed wait the upper end thereof. Consequently, this absorption tower can produce a large gas-liquid contact area in a small space and thereby achieve a high degree of desulfurization and a high degree of dust removal. It is known that such a liquid-column tower has particularly higher dedusting capability as compared with packed towers and the like.

At the bottom of absorption tower 10, a tank 14 for holding a slurry is formed. The slurry within tank 14 is sucked up by means of a circulating pump 15 and fed to spray pipes 12 through a circulation line 16. On the other hand, limestone C (finely powdered limestone) which has been formed into a slurry in a slurry preparation tank 18 having a stirrer 17 is suitably supplied to tank 14. Moreover, tank 14 is equipped with a means (not shown) for blowing oxidizing air in the form of fine bubbles while agitating the slurry within tank 14. Thus, the slurry having sulfur dioxide absorbed therein is brought into efficient contact with the air in tank 14.

A mist eliminator (not shown) is installed in flue gas outlet section 13. This mist eliminator serves to collect any mist produced as a result of gas-liquid contact and entrained by the flue gas, so that a large amount of mist containing sulfur dioxide, dust and the like may not be discharged together with the desulfurized flue gas A3. For example, the mist (or recovered liquid) collected by this mist eliminator is allowed to flow down from its lower end and return directly to tank 14.

During operation, in order to maintain the degree of desulfurization and the purity of gypsum at a high level, the boiler load (i.e., the flow rate of flue gas A2), the sulfur dioxide concentration in flue gas A2, the pH and limestone concentration of the absorbent slurry within tank 14, and the like are detected with sensors. On the basis of the results of detection, the feed rate of limestone to tank 14 and other parameters are suitably controlled by means of a controller (not shown).

Moreover, in order to make up for the water gradually lost from the slurry owing to evaporation in absorption tower 10 or the like, make-up water (such as industrial water) is suitably supplied, for example, to the aforesaid tank 14 and slurry preparation tank 18.

Furthermore, as peripheral equipment for extracting gypsum and dust solids separately from the slurry within tank 14 and for draining water in order to prevent the accumulation of impurities, desulfurizer 5 of this embodiment is equipped with various apparatus shown in FIG. 2 (i.e., a simplified settler 21, a magnetic dust separator 22, a centrifugal separator 23, a primary thickener 24, an agitation tank 25 and a secondary thickener 26).

Among them, simplified settler 21 functions to (effect gravity settling separation on the basis of the differences in particle size and specific gravity between gypsum and dust, and thereby separate and withdraw a dust slurry D1 having a higher dust concentration from tank 14. This simplified settler 21 consists of a cylindrical body disposed below the surface of the slurry within tank 14 and having an open lower end. The top of this cylindrical body is connected to the suction side of a pump 27 so that the slurry within tank 14 may be withdrawn as dust slurry D1 by way of this cylindrical body. The inner diameter and other dimensions of the cylindrical body are determined so that the flow velocity of the slurry in this cylindrical body is slower than the settling velocity of large-diameter gypsum particles and faster than the settling velocity of small-diameter dust particles and, therefore, the aforesaid gravity settling separation can be stably effected.

Magnetic dust separator 22 is an apparatus which has been proposed by the present applicant in Japanese Patent Application No. 310617/'91 (Japanese Patent Laid-Open No. 57142/'93). This apparatus consists of a narrowed path for conducting the slurry withdrawn from the side of tank 14 to a throat; a throat following the narrowed path; an electromagnet disposed in close proximity to the outside of the throat for exerting a magnetic force on the slurry passing through the throat; an expanded flow path following the throat; a separating plate for dividing the expanded flow path into two passages (i.e., those on the electromagnet side and the opposite side); and outlets for withdrawing the slurries separately from the two passages.

Since fly ash and other particles constituting the dust captured in the slurry contain ferromagnetic iron oxide as a component, most of the dust present in the slurry migrates to the electromagnet side in the aforesaid throat. Consequently, a dust slurry D2 having a relatively high dust concentration is withdrawn from the aforesaid outlet on the electromagnet side, while a gypsum slurry E1 having a relatively high gypsum concentration is withdrawn from the aforesaid outlet on the opposite side. In this embodiment, dust slurry D2, together with the aforesaid dust slurry D1, is transferred to a primary thickener 24 by means of a pump 28. On the other hand, gypsum slurry E1 is transferred to a centrifugal separator 23 by means of a pump 29, and subjected to a solid-liquid separation treatment. Thus, solid matter E2 containing gypsum at a high concentration is extracted.

Centrifugal separator 23 functions not only to separate solid matter from the slurry, but also to accumulate a gypsum solid having larger particle diameters into a solid layer. In contrast, the solid matter remaining in the filtrate discharged from this centrifugal separator 23 contains dust having smaller particle diameters at a higher concentration. Consequently, the filtrate from centrifugal Separator 23 is also equivalent to the dust slurry of the present invention and, therefore, will hereinafter be referred to as dust slurry D3. In this embodiment, dust slurry D3, together with the aforesaid dust slurries D1 and D2, is transferred to primary thickener 24 and subjected to a solid-liquid separation treatment.

Primary thickener 24 is a common continuous thickener for effecting precipitation thickening. The clear liquid discharged from an upper overflow path is treated as waste water F, while the thickened slurry (solid component) discharged from the bottom thereof is transferred to an agitation tank 25 as dust slurry D4.

Also in this primary thickener 24, a relatively great amount of dust having smaller particle diameters passes into the clear liquid (waste water F). Consequently, primary thickener 24 also functions to accumulate a gypsum solid having larger particle diameters into a solid layer.

Similarly to conventional desulfurization waste water, at least a part of waste water F is discharged, for example, after a waste water treatment, in order to cause the soluble impurities (e.g., chlorine) absorbed from the flue gas into the slurry to be expelled from the system. A part of waste water F may be reused by supplying it to slurry preparation tank 18 and absorption tower tank 14 as make-up water.

Agitation tank 25, which is equipped with an agitator 25a, allows a mixture of the supplied dust slurry D4 and industrial water G (liquid component) to stay therein with agitation for a predetermined period of time so that the gypsum solid present in dust slurry D4 may be completely dissolved in the liquid phase. An investigation conducted by the present inventors have revealed that, when dust slurry D4 is diluted five- to sixfold with industrial water G and allowed to stay with agitation for about 2 hours or less, the gypsum solid present in the slurry is completely dissolved and only dust having a lower solubility remains therein as a solid component.

Secondary thickener 26 is a continuous thickener for effecting the solid-liquid separation treatment of dust slurry D5 which has been diluted and subjected to the gypsum dissolution treatment using agitation tank 25. The thickened slurry (solid component) discharged from the bottom thereof is suitably treated and discharged out of the system of the desulfurizer as a dust solid D6. In this embodiment, the clear liquid H (liquid component) discharged from this secondary thickener 26 is fed to slurry preparation tank 18 and reused as the water (or a part of the water) for forming the absorbent (i.e., limestone C) into a slurry.

In dust solid D6, dust arising from flue gas and consisting essentially of fly ash is contained at a high concentration. For example, this dust solid D6 is solidified and dumped, or utilized as a raw material for the manufacture of cement. Alternatively, clear liquid H may be directly returned to absorption tower tank 14 and reused as a liquid component constituting the slurry.

Now, the operation of the above-described desulfurizer and the essential part of the flue gas treating process of the present invention which is carried out in a flue gas treating system including this desulfurizer are described hereinbelow.

In this embodiment, the dust concentration of flue gas is reduced to a level of 100 to 500 mg/Nm$^3$ in dry electrostatic precipitator 4, and the remaining dust is captured in absorption tower 10 of desulfurizer 5 to achieve a final target value of 10 mg/Nm$^3$ or less for the dust concentration.

Specifically, in this desulfurizer, the slurry fed to spray pipes 12 within absorption tower 10 by means of circulating pump 15 is injected upward from the nozzles of spray pipes 12. The spouted slurry scatters at its peak and then falls, so that the falling slurry and the spouted slurry collide with each other to produce fine droplets of the slurry. Thus, fine droplets of the slurry are produced successively, so that the slurry in the form of droplets is uniformly distributed in the tower.

As described above, untreated flue gas A2 containing sulfur dioxide, dust and the like flows upward i.e., in a counter-current manner) through the tower in which the absorbing fluid in the form of droplets flows downward, resulting in an increased gas-liquid contact area per unit volume. Moreover, since the flue gas is effectively dragged into the spouted streams of the slurry in the neighborhood of the nozzles, the slurry and the flue gas are effectively mixed, so that the absorption reaction of sulfur dioxide and the capture of dust are effectively performed. Thus, most of the sulfur dioxide and the remaining dust are removed in absorption tower 10.

The slurry, which is spouted from header pipes 12 and flows downward while absorbing sulfur dioxide and dust, falls onto the surface of the slurry within tank 14 and forcedly oxidized with fine air bubbles blown into tank 14. Thus, the absorbed carbon dioxide is completely oxidized and then undergoes a neutralization reaction with limestone to become a slurry containing gypsum at a high concentration.

As described above, the flue gas treating system of this embodiment is constructed so that a larger amount of dust is captured in absorption tower 10 than in the prior art. Consequently, if the system is operated in the conventional manner in which the slurry within tank 14 is withdrawn and subjected to a solid-liquid separation treatment and a part of the resulting filtrate is discharged out of the system of the desulfurizer as desulfurization waste water, the slurry within tank 14 in a steady state will contain a larger amount of dust than in the prior art. Accordingly, it is impossible to obtain highly pure gypsum at least equivalent to that obtained in the prior art.

However, in desulfurizer 5 of this embodiment, gypsum slurry E1 containing gypsum at a higher concentration as a result of separation from dust is withdrawn from the slurry within absorption tower 10 owing to the action of the above-described magnetic dust separator 22. This gypsum slurry E1 is subjected to solid-liquid separation in centrifugal separator 23, so that gypsum solid E2 is harvested as a by-product.

As the same time, owing to the action of simplified settler 21, magnetic dust separator 22 and centrifugal separator 23, dust slurries D1, D2 and D3 containing dust at a higher concentration as a result of separation from gypsum are withdrawn from the slurry within absorption tower 10. The solid matter present in these dust slurries is finally extracted by the solid-liquid separation treatment using secondary thickener 26, and discharged out of the system of desulfurizer 5 as dust solid D6.

Moreover, the aforesaid dust slurries are preliminarily subjected to a solid-liquid separation treatment (or thickening treatment) in primary thickener 24, so that a part of the liquid component is removed as waste water F. Thereafter, the thickened slurry is introduced into agitation tank 25 where it is mixed with a liquid (industrial water G) and agitated for a predetermined period of time, so that all of the gypsum solid is forcedly dissolved in the liquid phase. The resulting dust slurry D5 containing dust alone as the solid component is transferred to secondary thickener 26. Consequently, dust solid D6 comprises solid matter containing little gypsum, and most of the slight amount of gypsum present in dust slurries D1, D2 and D3 is dissolved in clear liquid H and returned to absorption tower tank 14 without being discharged out of the system.

That is, in the desulfurizer of this embodiment, the slurry which is continuously withdrawn in large amounts from absorption tower tank 14 by way of simplified settler 21 and magnetic dust separator 22 is treated in such a way that solid matter consisting essentially of dust, and its liquid component alone are extracted therefrom and discharged out of the system. Consequently, although a relatively large amount of dust is absorbed into the slurry within the absorption tower, the steady-state dust concentration of the slurry within the absorption tower can be maintained at a level equal to or lower than that in the prior art. Moreover, in this embodiment, gypsum solid E2 obtained as a by-product has a very high purity because gypsum slurry E1 containing gypsum at a higher concentration than the slurry within absorption tower tank 14 is used to harvest gypsum solid E2 by solid-liquid separation.

Accordingly, the flue gas treating process of this embodiment produces the following excellent effects.

(1) First of all, the dedusting capability of desulfurizer 5 can be fully utilized to achieve high overall dedusting capability. At the same time, this also allows a further reduction in the size and cost of electrostatic precipitator 4. Specifically, the dust concentration of flue gas at the outlet of electrostatic precipitator 4 is increased from the conventional level of 100 mg/Nm$^3$ or less to a level of 100 to 500 mg/Nm$^3$, so that the load of electrostatic precipitator 4 is markedly lessened. According to trial calculations made by the present inventors, the dust collecting area of the expensive electrostatic precipitator can be decreased by about 30%, resulting in a considerable cost reduction.

(2) Moreover, although combined type desulfurizer 5 is designed so as to capture a larger amount of dust than in the prior art, highly pure gypsum E2 can be recovered as described previously.

(3) Furthermore, since the dust concentration of the slurry within the absorption tower can be maintained at a low level, a loss in the activity of limestone present in this slurry can be minimized.

In this embodiment, peripheral equipment which has not been used in the prior art (i.e., simplified settler 21, magnetic dust separator 22, agitation tank 22, etc.) is required for the construction of the desulfurizer. However, according to trial calculations made by the present inventors, the increment in equipment cost due to the installation of these apparatus is relatively small and equal to about ⅕ of the decrement in the cost of the electrostatic precipitator.

It is to be understood that the present invention is not limited to the above-described embodiment, but may also be practiced in various other ways. For example, in the above-described embodiment, only one of simplified settler 21 and magnetic dust separator 22 may be installed. That is, only one of dust slurries D1 and D2 may be withdrawn depending upon the required purity of gypsum and other factors. Moreover, the gypsum dissolution treatment using agitation tank 25 may be omitted depending upon the required purity of gypsum and other factors.

Furthermore, the above-described simplified settler 21 and magnetic dust separator 22 may be replaced, for example, by a liquid compartment formed in the absorption tower tank for effecting the gravity settling separation of gypsum and dust, as is the case with the system disclosed in Japanese Patent Laid-Open No. 178022/'86. In this case, a slurry having a high gypsum concentration is withdrawn from the lower part of the liquid compartment, while a slurry having a high dust concentration is withdrawn from the upper part of the liquid compartment.

Also with respect to the type of the absorption tower, it goes without saying that the present invention is not limited to the use of a liquid-column type absorption tower, but may be applied to various other types of absorption towers such as spray towers, packed grid towers and gas dispersion type absorption towers. However, since liquid-column type absorption towers have particularly excellent dedusting capability as described previously, it is preferable to employ a liquid-column type absorption tower when the desired dust concentration of the treated flue gas is especially low.

Many other variations and modifications of the invention will be apparent to those skilled in the art without departing from the spirit and scope of the invention. The above-described embodiments are, therefore, intended to be merely exemplary, and all such variations and modifications are intended to be included within the scope of the invention as defined in the appended claims.

The disclosure of Japanese Patent Application No.9-365541 filed on Dec. 22, 1997 including specification, claims, drawings and summary are incorporated herein by reference in its entirety.

What is claimed is:

1. A flue gas treating process wherein flue gas is cooled to a temperature of 80 to 110° C. by heat recovery means, introduced into a dry electrostatic precipitator in order to reduce the dust concentration of the flue gas, and then introduced into an absorption tower of a desulfurizer based on the wet lime-gypsum method in order to reduce the sulfur oxide concentration and dust concentration of the flue gas by bringing the flue gas into contact with a slurry containing a calcium compound as the absorbent, said desulfurizer comprising an apparatus selected from the group consisting of a simplified settler, a magnetic dust separator, and both of the above to effect dust removal in the desulfurizer, and the dust concentration of the flue gas leaving said dry electrostatic precipitator and introduced into said absorption tower is adjusted to a level of above 100 to 500 mg/Nm$^3$.

2. A flue gas treating process as claimed in claim 1 wherein a dust slurry having a higher dust concentration is separated and withdrawn from the slurry within said absorption tower, and then subjected to a solid-liquid separation treatment, whereby solid matter containing dust at a high concentration is extracted and discharged out of the system of said desulfurizer.

3. A flue gas treating process as claimed in claim 1 wherein a part of the slurry within said absorption tower is withdrawn and mixed with water, this mixture is allowed to stay in an agitation tank so as to cause the solid gypsum present in the slurry to be dissolved in the liquid of the slurry, and the resulting slurry is subjected to a solid-liquid separation treatment, whereby solid matter containing dust at a high concentration is extracted and discharged out of the system of said desulfurizer.

4. A flue gas treating process as claimed in claim 3 wherein, when a part of the slurry within said absorption tower is withdrawn, a dust slurry having a higher dust concentration is separated and withdrawn.

5. A flue gas treating process as claimed in claim 2 wherein at least a part of the liquid resulting from said solid-liquid separation treatment is reused by returning it to the slurry within said absorption tower.

* * * * *